W. RIGLING.
EGG TESTER.
APPLICATION FILED SEPT. 2, 1909.
940,361.
Patented Nov. 16, 1909.
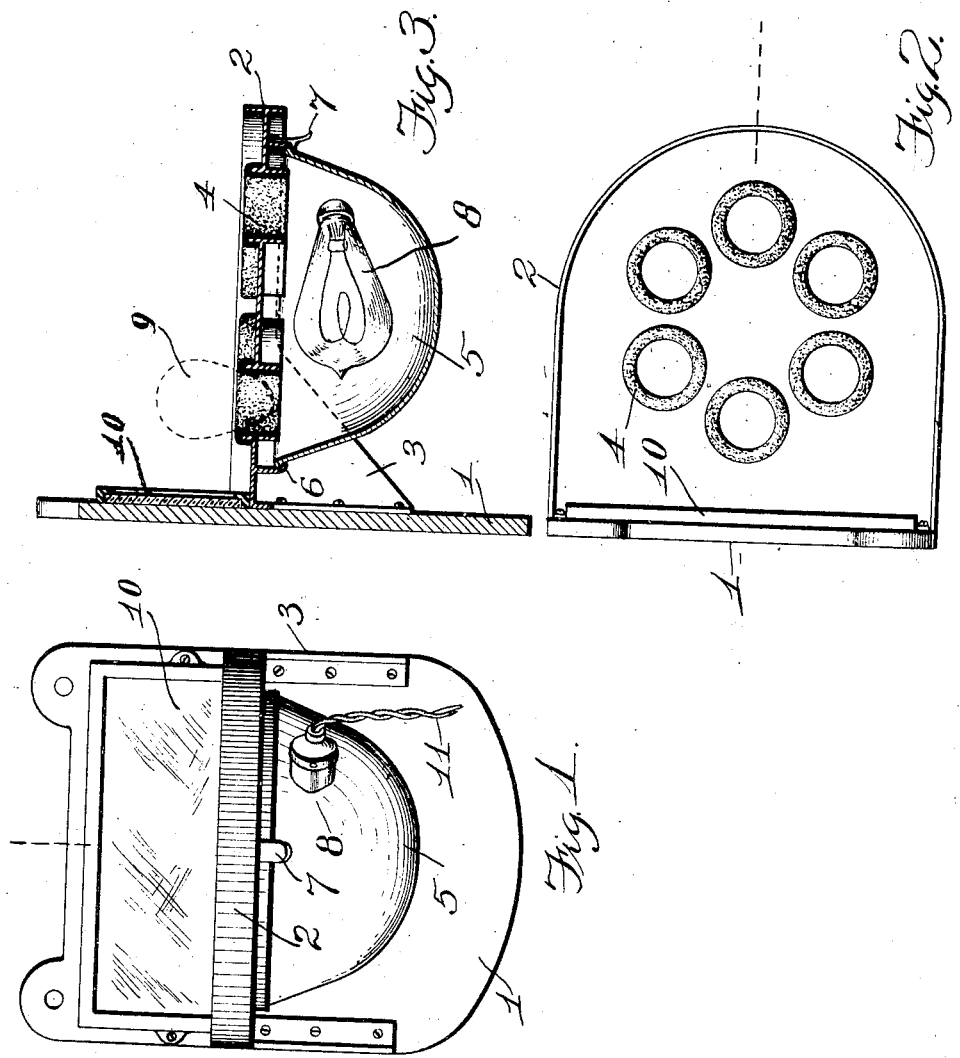
Witnesses:
Elmer R. Shipley
Elsie Myers
William Rigling
Inventor
by James W. See
Attorney

UNITED STATES PATENT OFFICE.

WILLIAM RIGLING, OF HAMILTON, OHIO.

EGG-TESTER.

940,361.  Specification of Letters Patent.  Patented Nov. 16, 1909.

Application filed September 2, 1909. Serial No. 515,847.

*To all whom it may concern:*

Be it known that I, WILLIAM RIGLING, a citizen of the United States, residing in Hamilton, Butler county, Ohio, (post-office address corner McGlynn and Hanover streets, Hamilton, Ohio,) have invented certain new and useful Improvements in Egg-Testers, of which the following is a specification.

The present improvements in egg testers will be readily understood from the following description taken in connection with the accompanying drawing in which:—

Figure 1 is a front elevation of my improved egg tester; Fig. 2 a plan of the same; and Fig. 3 a vertical section of the same.

In the drawing:—1, indicates a vertical back-piece adapted to be hung or otherwise secured to a wall or other vertical surface; 2, a shelf projecting horizontally therefrom; 3, supporting brackets connecting the back-piece with the shelf; 4, a group of fabric-lined perforations through the shelf, each perforation being adapted to receive and support an egg in upright position; 5, a concave reflector disposed below the shelf, with its concave side uppermost, the diameter of the reflector being such that the rim of the reflector will inclose the entire group of perforations; 6, a hook supported at the under side of the shelf and adapted to engage under the outwardly projecting portion of the rim of the reflector; 7, a spring hook supported under the shelf and adapted also to engage under the rim of the reflector at the point opposite the hook 6; 8, an electric lamp disposed within the reflector; 9, one of the eggs supported by the shelf; 10, a forwardly facing mirror disposed against the back-piece and over the shelf; and 11, a flexible conductor for conveying the current to the lamp.

In using the device an egg is placed in each perforation of the shelf and is then viewed vertically, the illumination due to the lamp and reflector, permitting the observer to judge of the condition of the eggs. It sometimes happens that the yolk of an egg is shifted to one side and become attached to the lining membrane. Such an egg may be perfectly sound but is not of high grade for domestic use, owing to the fact that when the egg is broken the yolk will not come out freely with the white portion of the egg, in other words, such an egg represents what may be called a second grade of goodness in eggs. This condition of eggs cannot be satisfactorily determined by looking endwise through the eggs but requires a sidewise or oblique view. The observer standing in front of the apparatus may get a fair view of the fronts and sides of the eggs, but not of the backs and it is the mirror that aids in exposing the condition at the rear of the eggs. The process of testing may be rather rapid, a comprehensive sweeping glance at the eggs and at the mirror yielding instant results.

The reflector is readily detached for purposes of cleaning, and its form and location are such as to catch any foreign matter dropping through the perforations.

I claim:—

1. An egg tester comprising a back piece, a shelf projecting horizontally therefrom and provided with a group of fabric-lined egg-receiving perforations, a concave reflector disposed with its concave side upward and below the shelf and encircling the group of perforations with its rim, and an electric lamp disposed within the concave reflector, combined substantially as set forth.

2. An egg tester comprising a back-piece, a shelf projecting horizontally therefrom and provided with a group of fabric-lined egg-receiving perforations, a concave reflector disposed with its concave side upward and below the shelf and encircling the group of perforations with its rim, hooks depending from the shelf and adapted to engage the rim of the reflector, and an electric lamp disposed within the concave reflector, combined substantially as set forth.

3. An egg tester comprising a horizontal member provided with a group of fabric-lined egg-receiving perforations, an illuminating device disposed below said perforations, and a vertical mirror disposed above said member at one side of said group of perforations, combined substantially as set forth.

4. An egg tester comprising a back-piece, a shelf projecting horizontally therefrom and provided with a group of fabric-lined egg-receiving perforations, a concave reflector disposed with its concave side upward and below the shelf and encircling the group of perforations with its rim, a forwardly facing mirror disposed against said back-piece, and an electric lamp disposed within the concave reflector, combined substantially as set forth.

WILLIAM RIGLING.

Witnesses:
 ELSIE MYERS,
 LUTIE HALE.